(12) United States Patent
Montagna et al.

(10) Patent No.: US 6,357,979 B1
(45) Date of Patent: Mar. 19, 2002

(54) CARGO VAN BULKHEAD

(75) Inventors: John Montagna, Metamora; Jerald Gower, Beaverton; Robert C. Whiteside, Harrison, all of MI (US)

(73) Assignee: Durakon Industries, Inc., Lapeer, MI (US)

(*) Notice: Subject to any disclaimer, the term of this patent is extended or adjusted under 35 U.S.C. 154(b) by 0 days.

(21) Appl. No.: 09/557,391

(22) Filed: Apr. 24, 2000

(51) Int. Cl.$^7$ .................................................. B60P 7/14
(52) U.S. Cl. ..................................... 410/129; 410/121
(58) Field of Search ............................. 410/121, 129, 410/140; 62/447; 296/37.16, 37.8, 39.1, 39.2, 24.1; 280/749

(56) References Cited

U.S. PATENT DOCUMENTS

| | | | | |
|---|---|---|---|---|
| 1,896,198 A | * | 2/1933 | MacMillan | 410/129 |
| 2,895,431 A | * | 7/1959 | Ford | 410/129 |
| 4,621,856 A | * | 11/1986 | McKenzie | 296/24.1 |
| 4,750,776 A | * | 6/1988 | Barben | 296/39.2 |
| 4,938,518 A | * | 7/1990 | Willemsen | 296/24.1 |
| 5,010,943 A | * | 4/1991 | Boyer | 296/24.1 X |
| 5,046,775 A | * | 9/1991 | Marcum, Jr. et al. | 296/39.2 |
| 5,139,300 A | * | 8/1992 | Carriere | 296/24.1 X |
| 5,221,119 A | * | 6/1993 | Emery | 296/39.2 |
| 5,246,261 A | * | 9/1993 | McCormack | 296/24.1 |
| 5,984,601 A | * | 11/1999 | Jevaney et al. | 410/129 |
| 6,010,286 A | * | 1/2000 | Cross et al. | 410/129 |

* cited by examiner

*Primary Examiner*—Stephen T. Gordon
(74) *Attorney, Agent, or Firm*—Brinks Hofer Gilson & Lione (57) ABSTRACT

A cargo van bulkhead provides a barrier between the driver and passenger of a van and the cargo compartment. The bulkhead comprises a molded, complexly curved unitary panel which fits snugly against the bottom, sidewalls and top of the van behind the driver's and passenger's seats. The bulkhead includes a plurality of horizontal convolutions which define alternate ribs or projections and recesses which greatly improve the rigidity and strength of the bulkhead. An irregular flange disposed about the periphery of the bulkhead is configured to mimic the interior profile of the van and thus facilitate installation and securement thereto. An optional opening in the upper central portion of the bulkhead may receive a window which facilitates inspection of the cargo within the van as well as a view out the rear of the van if the rear doors of the van are equipped with windows. A first alternate embodiment comprehends a pair of bulkhead panels secured together at a plurality of locations on opposing adjacent surfaces. A second alternate embodiment includes foam disposed between the bulkhead panels.

22 Claims, 6 Drawing Sheets

CARGO VAN BULKHEAD

BACKGROUND OF THE INVENTION

The invention relates generally to dividers for cargo vehicles and more specifically to a bulkhead for installation in a cargo van immediately behind the passenger and driver seats.

Cargo vans are generally light to medium duty trucks having a full height cargo region which extends the length of the van and typically includes a an open cargo compartment accessible through a side door and a pair of rear doors. Driver and passenger front doors provide access to the seats. Such vans are popular and routinely utilized in many commercial and business endeavors. Package delivery companies and repairmen such as plumbers, electricians, handymen, carpet installers and the like rely upon these vehicles every day to complete their work.

Unfortunately, cargo vans tend to be sold in a purely utilitarian configuration which can be disadvantageous to the driver and passenger. The interior sidewalls and roof often lack any scuff panels or insulation. Similarly, the driver compartment is merely the forward portion of the cargo compartment in which seats are installed. So configured, the driver and passenger are exposed to relatively high noise levels. The heating and, if so equipped, air conditioning, can be problematic inasmuch as typically only the driver and passenger area must be heated or air conditioned but because the interior of the van is open, the entire interior of the van will load the heating or cooling system. Frequently such systems are incapable of handling the heating or cooling load of the entire vehicle. Lastly, unsecured cargo may move about the interior of the van and hit the driver's and passenger's seats or their occupants. During a panic stop, motion of unsecured cargo can be both significant and problematic.

It is therefore apparent that, notwithstanding the utility of cargo vans, improvements in their overall design are both possible and desirable.

SUMMARY OF THE INVENTION

A cargo van bulkhead provides a barrier between the driver and passenger of a van and the cargo compartment. The bulkhead comprises a molded, complexly curved unitary panel which fits snugly against the bottom, sidewalls and top of the van behind the driver's and passenger's seats. The bulkhead includes a plurality of horizontal convolutions which define alternate ribs or projections and recesses which greatly improve the rigidity and strength of the bulkhead. An irregular flange disposed about the periphery of the bulkhead is configured to mimic the interior profile of the van and thus facilitate installation and securement thereto. Fasteners extending through the flange secure the bulkhead to interior members of the van. An optional opening in the upper central portion of the bulkhead may receive a window which facilitates inspection of the cargo within the rear doors of the van are equipped with windows.

A first alternate embodiment of the cargo van bulkhead according to the present invention comprehends a first or front panel secured to a second or rear panel at a plurality of spaced apart weld points and having adjacent peripheral edges. A second alternate embodiment comprehends the first alternate embodiment bulkhead with foamed in-situ foam or insulation disposed between the two panels.

Thus it is an object of the present invention to provide a bulkhead for a cargo van.

It is a further object of the present invention to provide a bulkhead for disposition in a cargo van immediately behind the driver and passenger seats.

It is a still further object of the present invention to provide a bulkhead for a cargo van having a plurality of horizontal convolutions which improve the strength and rigidity of the bulkhead.

It is a still further object of the present invention to provide a bulkhead having a window which facilitates inspection of the cargo by the driver or passenger.

It is a still further object of the present invention to provide a bulkhead having an openable window which provides a pass-through between the forward compartment and the cargo compartment of a van.

It is a still further object of the present invention to provide a bulkhead for a cargo van having a periphery which closely matches the interior of a cargo van.

It is a still further object of the present invention to provide a bulkhead for a cargo van having a complexly configured peripheral flange which facilitates securement of the bulkhead to the roof, sidewalls and floor of a cargo van.

It is a still further object of the present invention to provide a bulkhead for a cargo van having first and second panels which are secured together at a plurality of weld points.

It is a still further object of the present invention to provide a bulkhead for a cargo van having first and second spaced apart panels which define an interior filled with foam or insulation.

Further objects and advantages of the present invention will become apparent by reference to the following description of the preferred embodiment and appended drawings wherein like reference numbers refer to the same component, element or feature.

DESCRIPTION OF THE PREFERRED AND ALTERNATE EMBODIMENTS

Figure 1:
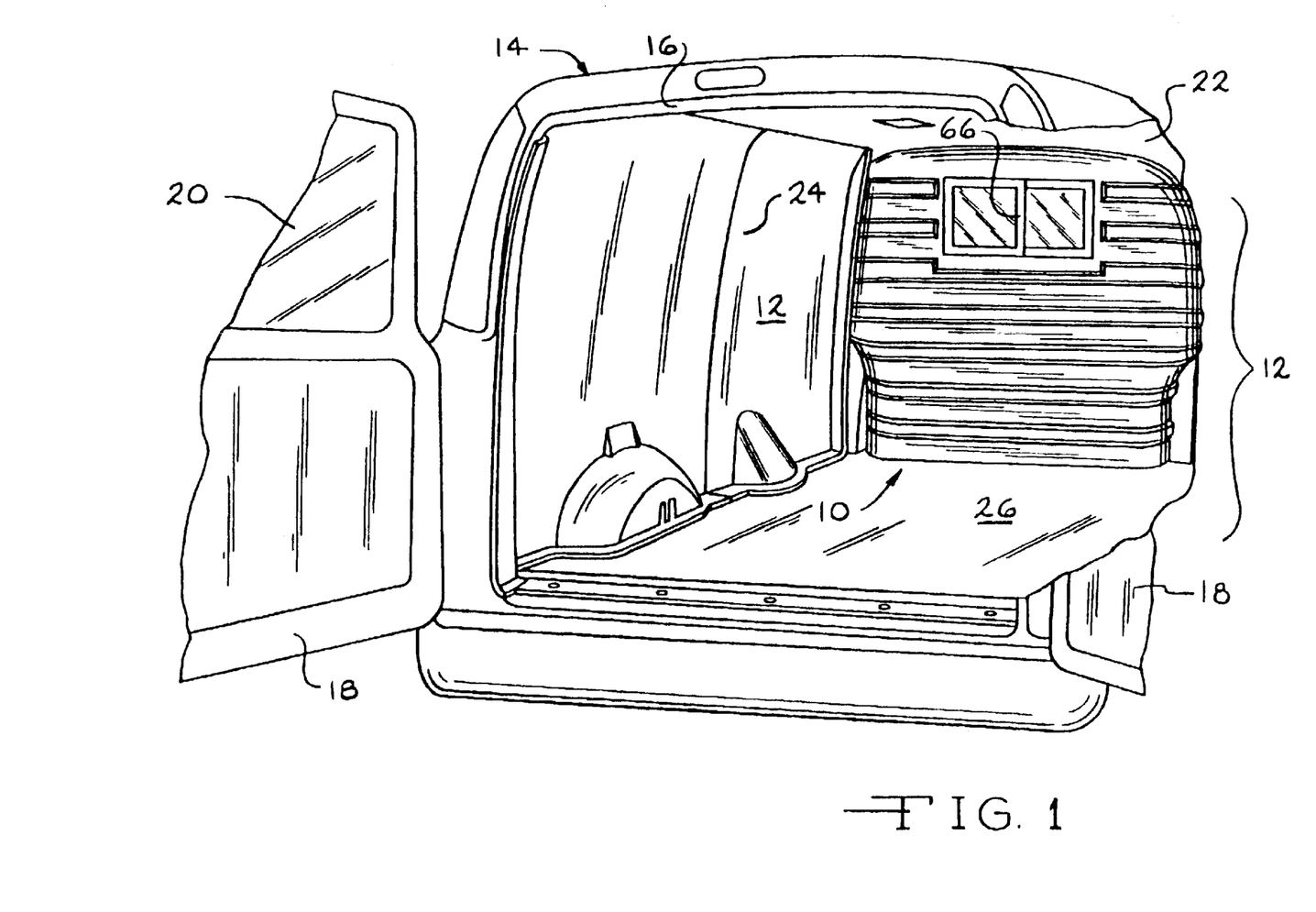
FIG. 1 is a perspective view with portions broken away of a cargo van with a bulkhead according to the present invention installed therein.

Referring now to FIG. 1, a cargo van bulkhead according to the present invention is illustrated and generally designated by the reference number 10. The cargo van bulkhead 10 typically is disposed within an interior 12 of a cargo van 14. The cargo van 14 typically includes a rear opening 16 which may be closed and secured by a pair of opposed, oppositely hinged doors 18 having windows 20. Alternatively, a single door or a pair of doors hinged at the top and bottom of the van 14 (both not illustrated) may be utilized to close and secure the rear opening 16 of the van 14.

The cargo van 14 includes an interior roof or top panel 22, interior sidewall panels 24 and an interior floor or bottom panel 26 which define the interior 12 of the cargo van 14 as will be readily appreciated. The top panel 22, the sidewall panels 24 and the bottom panel 26 may be either trim panels which finish and improve the appearance of interior 12 of the cargo van 14 or may simply be the inside surface of the outer metal skin of the cargo van 14. Preferably, the cargo van bulkhead 10 sits well forward in the interior 12, immediately behind the driver's and passenger's seats, establishes or defines a driver and passenger compartment in the forward portion of the interior 12 and a cargo region in the rearward portion of the interior 12 and separates these two areas.

Figure 2:
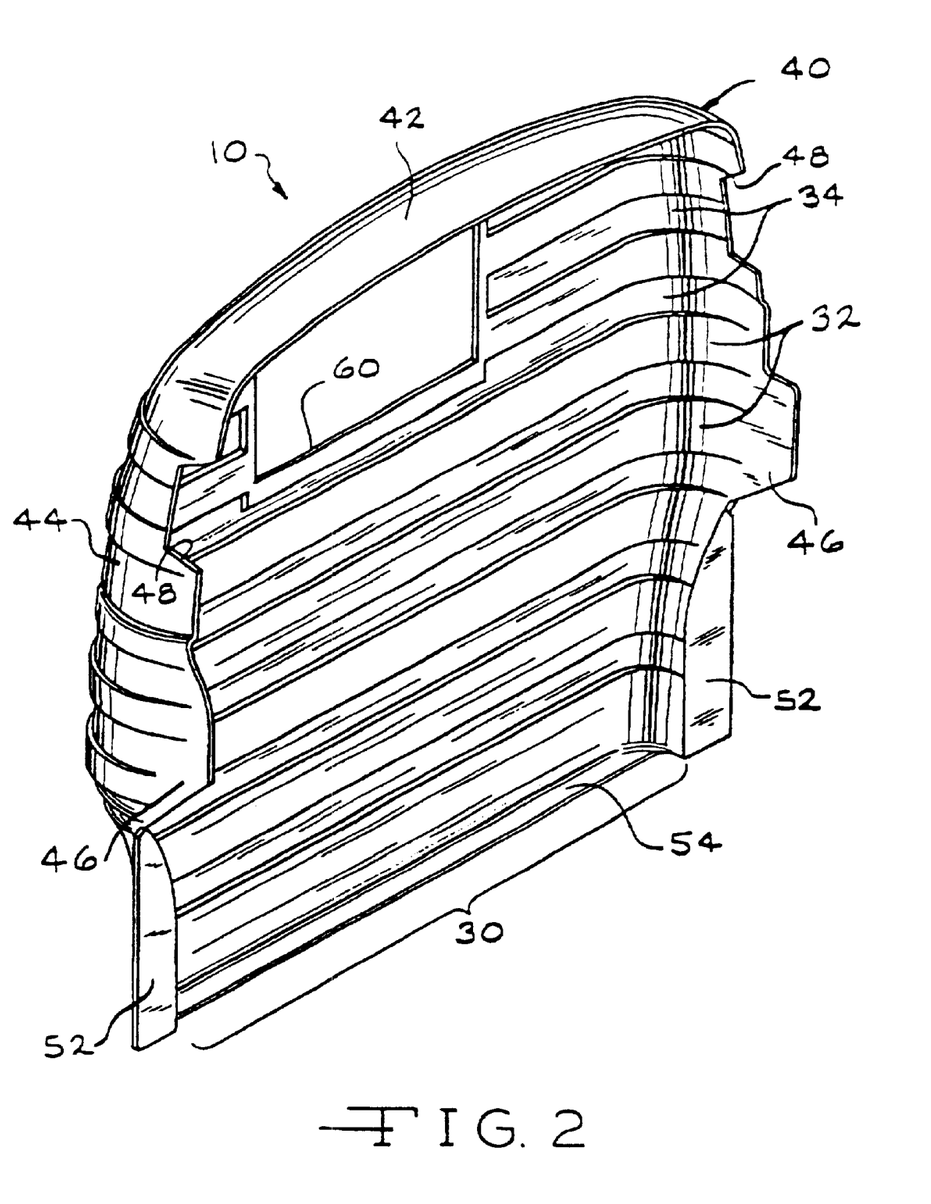
FIG. 2 is a front, perspective view of a cargo van bulkhead according to the present invention.
Figure 3:
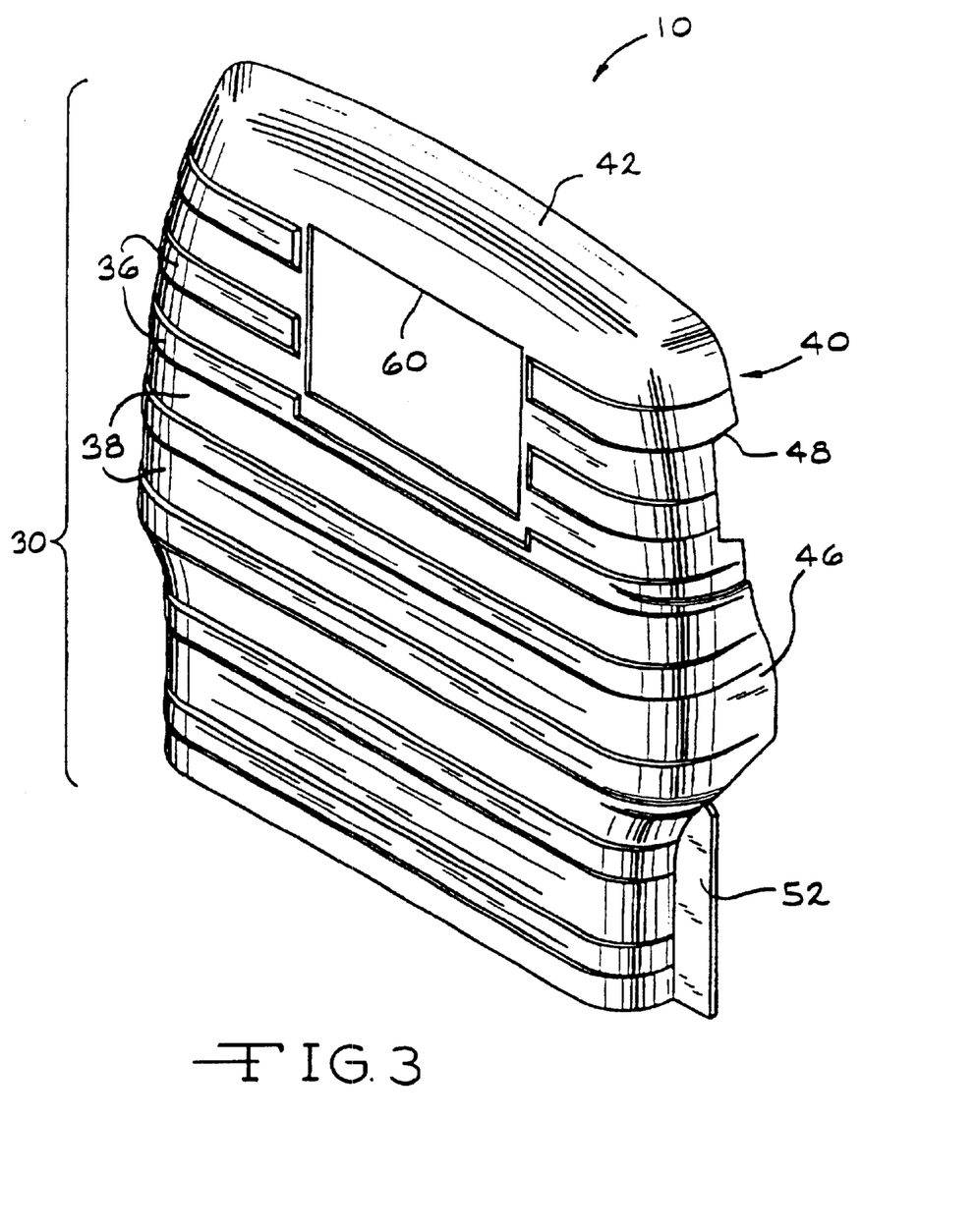
FIG. 3 is a rear, perspective view of a cargo van bulkhead according to the present invention.
Figure 4:
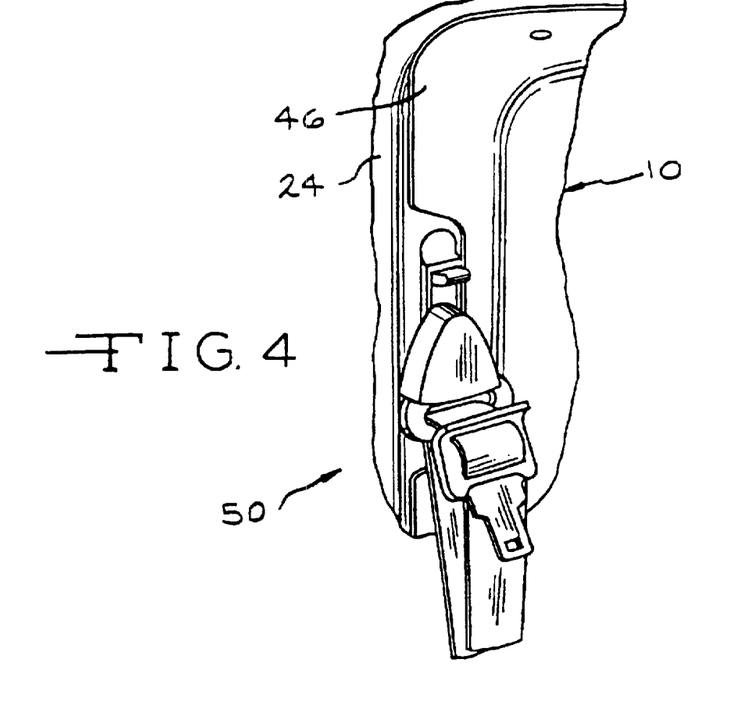
FIG. 4 is an enlarged, fragmentary view of a cargo van bulkhead according to the present invention illustrating installation details.

Turning now to FIGS. 2, 3, and 4, the cargo van bulkhead 10 defines a unitary, complexly curved assembly having numerous features. A central region 30 of the bulkhead 10 includes and defines a plurality of horizontal convolutions defining pluralities of bands or strips of alternating ribs or projections 32 and recesses 34. Inasmuch as the bulkhead 10 is a single thickness of relatively thin material, it will be appreciated that the ribs or projections 32 on the front face of the bulkhead 10 illustrated in FIG. 2 are the same regions as the recesses 36 on the rear face of the bulkhead 10 illustrated in FIG. 3. Likewise, the recesses 34 illustrated in FIG. 2 on the front side of the bulkhead 10 are the same regions as the ribs or projections 38 on the rear face of the bulkhead illustrated in FIG. 3.

As illustrated, the ribs 32 and 38 and recesses 34 and 36 may be of varying size but are both preferably on the order of from 2 inches (5.1 cm) to 4 inches (10.2 cm) in height and preferably not smaller than 1 inch (2.54 cm) nor greater than 5 inches (12.7 cm). Preferably, the ribs 32 and 38 and the recesses 34 and 36 are from between about 0.5 inches (1.27 cm) to 1.5 inches (3.81 cm) in depth.

About the periphery of the bulkhead 10 is an irregular flange 40 which faces the front of the cargo van 14. At the top of the bulkhead 10 is a top flange region 42 which is flat in its central portion. That is, a portion of the top flange 42 is preferably horizontal when viewed from a side and its side-to-side curvature preferably accurately matches the curvature of the top panel 22 of the cargo van 14 such that the bulkhead 10 may be disposed in snug contact therewith. If desired, a plurality of fasteners (not illustrated) may be utilized to attach the bulkhead 10 to the top panel 22 and thereby provide a reasonably good seal therebetween.

A curved, intermediate region 44 smoothly curves downwardly and to the rear and merges with the central region 30 of the bulkhead 10. The projections 32 and 38 and corresponding recesses 34 and 36 smoothly curve in the intermediate region 44 and merge into a pair of sidewall flanges 46. The upper portions of the sidewall flanges 46 may include cutouts 48 or similar features which adapt the cargo van bulkhead 10 to installation within a specific model and manufacture of cargo van 14. Specifically, the cutouts 48 may accommodate the components of seat belt systems such as the sidewall tie points and height adjuster assemblies 50.

The projections 32 and 38 and the recesses 34 and 36 extend around the curved, intermediate region 44 and merge into the pair of sidewall flanges 46, their depth reducing to zero such that the forward portions of the sidewall flanges 46 are substantially smooth. This facilitates securement of the bulkhead 10 and more specifically the sidewall flanges 46 to the sidewall panels 24 of the cargo van 14, if desired, and also facilitates and improves a seal therebetween. Depending upon the configuration of the sidewall panels 24 of the cargo van 14 and other variables, a pair of outwardly extending ears or flanges 52 may be disposed adjacent the lower portion of the bulkhead 10. As will be appreciated, the flanges 52 may take different shapes to accommodate varied configurations of the interior surfaces of the sidewall panels 24 of different cargo vans 14. The ears or flanges 52 also preferably seal against the sidewall panels 24 of the cargo van 14.

Figure 5:
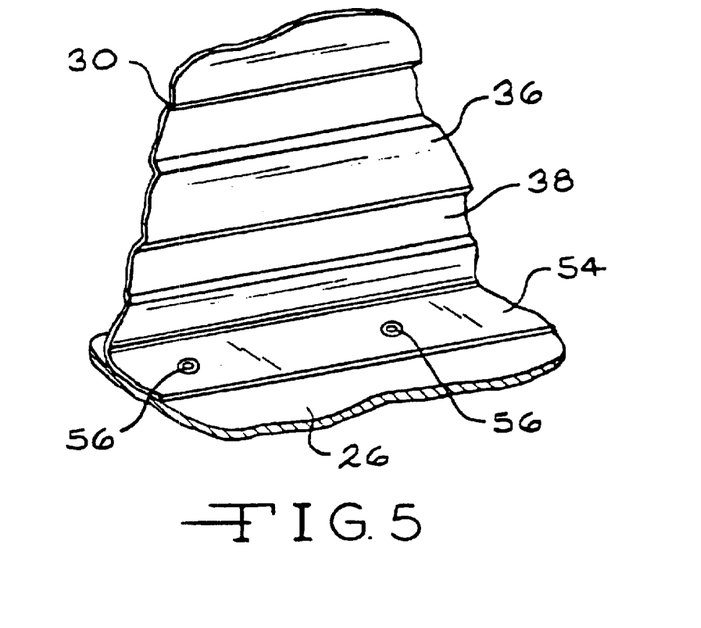
FIG. 5 is a fragmentary, perspective view of the bottom portion of a cargo van bulkhead according to the present invention installed in a cargo van.

Turning now to FIGS. 2 and 5, the irregular flange 40 at the bottom of the cargo van bulkhead 10 includes a smooth, planar region 54. The smooth planar region 54 is preferably horizontal and extends across substantially the full width of the bulkhead 10. A plurality of fasteners 56 which may be sheet metal screws, pop-rivets, Christmas tree fasteners or other semi-permanent or readily removable fasteners attach the smooth, planar region 54 of the irregular flange 40 to the floor or bottom panel 26 of the cargo van 14.

As illustrated in FIGS. 1, 2 and 3, the central region 30 of the bulkhead 10 may include a relatively large, rectangular opening or cutout 60 which may receive a two panel sliding window assembly 66 as illustrated in FIG. 1, a fixed window assembly, a hinged or pivoted window assembly, a surveillance mirror, security bars or a screen. It will be appreciated that the specific component installed within the opening 60 may vary widely and generally conform to the use of the cargo van 14 into which the cargo van bulkhead 10 is installed. It will further be appreciated that the opening or cutout 60 may be omitted, if desired, and that the adjacent ribs 32 and 38 and the recesses 34 and 36 may continue uninterrupted across the width of the central region 30 of the bulkhead 10.

With regard to manufacture, the bulkhead 10 is preferably formed of a single, unitary panel or sheet of thermoplastic material. For example, high density polyethylene (HDPE) or similar thermoplastic material which may be accurately thermoformed has been found highly suitable. Typically, such material is first formed into a planar sheet of sufficient size through known processes such as extrusion. The planar sheet is then heated and placed into a vacuum forming mold and conformed to the face of a forming die. The formed bulkhead 10 is then allowed to cool and appropriately trimmed. The bulkhead 10 is then ready for installation in the cargo van 14 as illustrated and described above.

Figure 6:
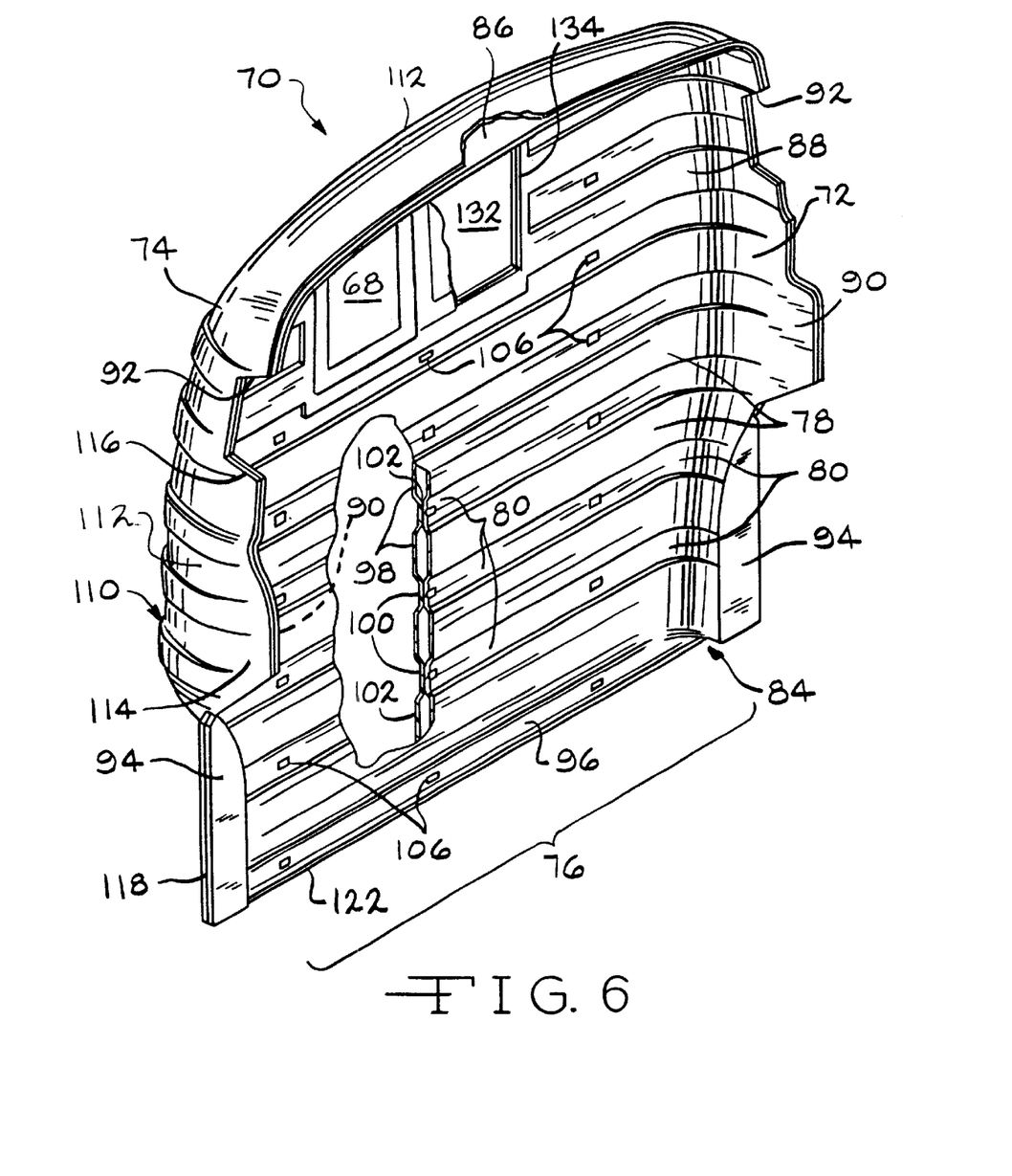
FIG. 6 is a front, perspective view with portions broken away of a first alternate embodiment cargo van bulkhead according to the present invention.
Figure 7:
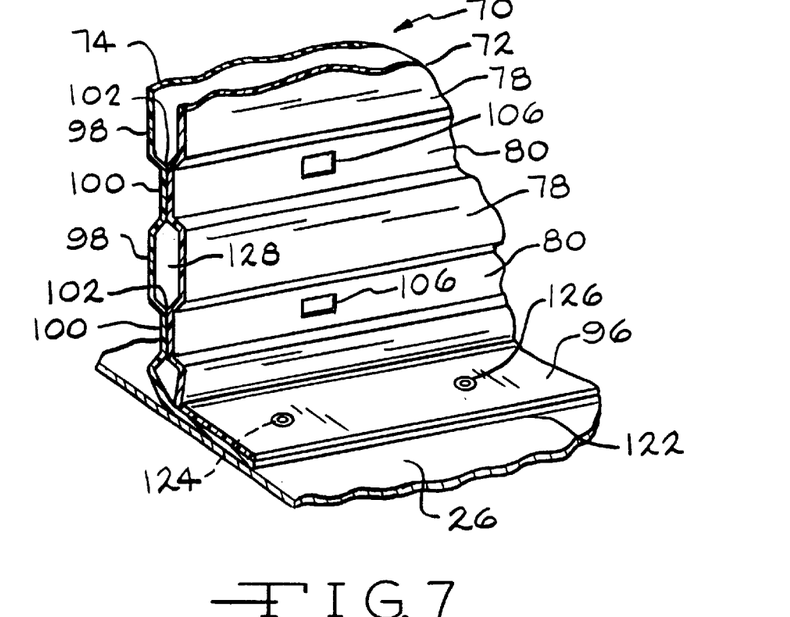
FIG. 7 is a fragmentary, perspective view of a lower portion and bottom flange of a first alternate embodiment cargo van bulkhead according to the present invention installed in a cargo van.

Referring now to FIGS. 6 and 7, a first alternate embodiment bulkhead for a cargo van 14 or similar vehicle is illustrated and designated by the reference number 70. The first alternate embodiment bulkhead 70 is similar to the preferred embodiment bulkhead 10 except that it comprises a first or front panel 72 and a slightly larger second or rearward panel 74. The first or front panel 72 of the first alternate embodiment bulkhead 70, for all intents and purposes, is identical to the preferred embodiment bulkhead 10. That is, it includes a central region 76 having horizontal convolutions defining pluralities of alternating horizontal ribs or projections 78 and recesses 80. The height and depth of the ribs or projections 78 and recesses 80 are preferably as described above with regard to the preferred embodiment bulkhead 10.

About the periphery of the first panel 72 of the first alternate embodiment bulkhead 70 is an irregular flange 84 which is directed toward the front of the cargo van 14. At the top of the first alternate embodiment bulkhead 70 is a top flange region 86 which is substantially flat in its central portion. If desired, a plurality of fasteners (not illustrated) may be utilized to attach the bulkhead 70 to the top panel 22 of the cargo van 14 and thereby provide a reasonably good seal therebetween. A curved intermediate region 88 extends around the central region 76 and smoothly curves and merges the central region 76 of the first panel 72 of the bulkhead 70 with the irregular flange 84. The ribs or projections 78 and the recesses 80 smoothly curve in the intermediate region 88 and merge into a pair of sidewall flanges 90. The sidewall flanges 90 may include cutouts 92 or similar features which adapt the first alternate embodiment bulkhead 70 to installation within a specific model and manufacture of cargo van 14. At the lower region of the first panel 72 of the bulkhead 70 are disposed a pair of outwardly extending ears or flanges 94. Typically, the flanges 94 may take slightly different shapes to accommodate and seal against varied configurations of the interior surfaces of the sidewall panels 24 of different cargo vans 14. Finally, at the lower portion of the front panel 72 is a forwardly extending lower flange 96.

Immediately adjacent and secured to the front panel 72 is the second or rear panel 74. The second or rear panel 74 is generally similar to and just slightly larger than the first or front panel 72 such that it receives or accepts the front panel 72 as illustrated in FIG. 6. However, the second panel 74 includes a mirror image or reverse pattern of ribs or projections 98 and recesses 100 relative to the first or front panel 72 such that the opposing faces 102 of the recesses 80 and 100 are in intimate contact with one another across the width of the central region 76 of the bulkhead 70. At a plurality of locations across the adjacent faces 102 of the front panel 72 and the rear panel 74 of the bulkhead 70 are a plurality of weld points 106. The weld points 106 are sites of preferably autogenous bonding wherein the material from which the panels 72 and 74 are formed is heated and welded together. Alternatively, suitable adhesives may be utilized to secure the panels 72 and 74 together continuously along the opposing faces 102 or at a suitable number of locations. This intimately secures the first and second panels 72 and 74 together and greatly increases the strength and rigidity of the bulkhead 70 relative to the single thickness of the preferred embodiment bulkhead 10. The double wall construction of the first alternate embodiment cargo van bulkhead 70 also provides improved sound and thermal isolation between its faces.

The second or rear panel 74 of the bulkhead 70 also includes an irregular flange 110 which is directed toward the front of the cargo van 14 and overlays the irregular flange 84 of the first or front panel 72. Preferably the irregular flange 110 of the second panel 74 is secured by autogenous bonding or an adhesive at its full peripheral contact with the irregular flange 84 of the first panel 72. Thus, at the top of the bulkhead 70 is a top flange region 112 which is flat in its central portion and which, as noted, may be secured to the top flange region 86 of the first or front panel 72 by an adhesive or autogenous bonding. The ribs or projections 98 and recesses 100 smoothly curve in the intermediate region 112 and merge into the sidewall flanges 114. In a fashion similar to the first or front panel 72, the sidewall flanges 114 of the rear panel 74 may include cutouts 116 or similar features which adapt the first alternate cargo van bulkhead 70 to installation within a specific model and manufacture of cargo van 14. The ribs or projections 98 and the recesses 100 extend around the intermediate region 112 and merge with sidewall flanges 114, their depth reducing to zero such that the forward portions of the sidewall flanges 114 are substantially flat or smooth.

The second or rear panel 74 also include a pair of outwardly extending ears or flanges 118 which are in contact with the ears or flanges 94 of the first or front panel 72. These adjacent surfaces may also be secured together by an adhesive or autogenous bonding, if desired. The second or rear panel 74 also includes a lower forwardly directed flange 122 adjacent which the corresponding flange 96 of the first or forward panel is disposed. The flanges 96 and 122 may include aligned openings 124 through which fasteners 126 may be disposed to secure the bulkhead 70 to the floor 26 of the cargo van 14. It should be appreciated that the interior voids or spaces 128 between the front panel 72 and the rear panel 74 in the first alternate embodiment bulkhead 70 are empty, i.e., filled with air. Finally and depending upon the application of the bulkhead 70, it may also include an opening 132 formed in both the panels 72 and 74. The opening 132 may be left open as a pass-through but preferably receives a window assembly 68 having slidable and thus openable and closeable panels or lights. Peripheral flanges 134 formed in the panels 72 and 74 define the opening 132 and, are preferably secured together by autogenous bonding or an adhesive. As noted above, the opening 132 formed in both panels 72 and 74 may be omitted, if desired, and the ribs 78 and 98 and the recesses 80 and 100 may continue interrupted across the central region 76 of the bulkhead 70.

Figure 8:
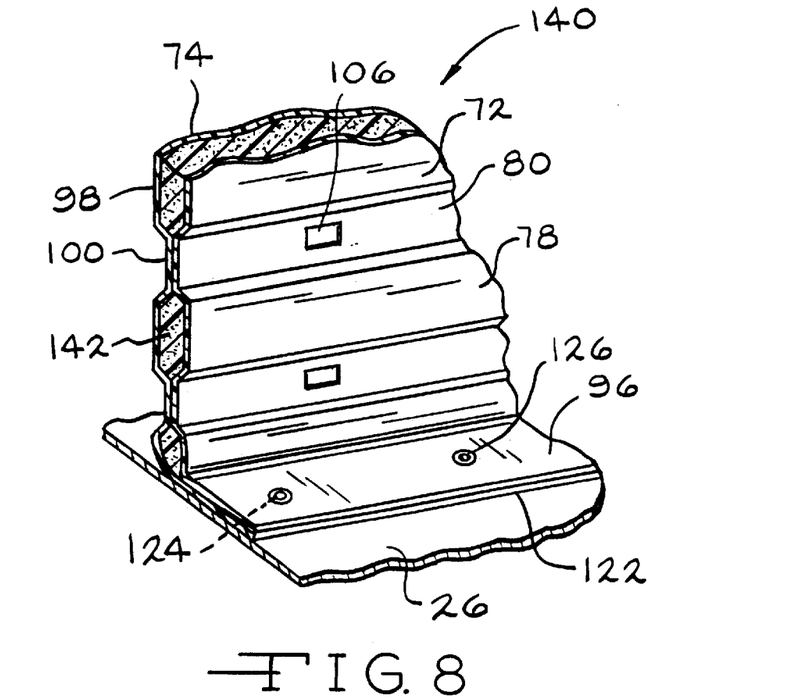
FIG. 8 is a fragmentary, perspective view of a lower portion and bottom flange of a second alternate embodiment cargo van bulkhead according to the present invention installed in a cargo van.

Referring now to FIGS. 6 and 8, a portion of a second alternate embodiment bulkhead according to the present invention is illustrated and designated by the reference number 140. The second alternate embodiment bulkhead 140 is similar in most respects to the first alternate embodiment bulkhead 70 in that it includes a first or front panel 72 and a second or rear panel 74. The first or front panel 72 includes the central region 76, the ribs or projections 78, the recesses 80 and the irregular flange 84 with its attendant features and details, all as illustrated in FIG. 6 with regard to the first alternate embodiment bulkhead 70. Likewise, the second or rear panel 74 includes the mirror image ribs or projections 98, the recesses 100 and the irregular flange 110 with all its attendant features and details discussed above with regard to the first alternate embodiment bulkhead 70. Likewise, the second alternate embodiment bulkhead 140 may include the window opening 132, the window assembly 68 and the peripheral contacting flanges 134. The front panel 72 and the rear panel 74 of the second alternate embodiment bulkhead 140 are similarly secured together at the weld points 106 and about the irregular, intimately contacting flanges 84 and 110 in a manner similar or identical to that of the first alternate embodiment bulkhead 70.

The distinction between the first alternate embodiment bulkhead 70 and the second alternate embodiment bulkhead 140 is that the second embodiment bulkhead 140 includes in-situ or foamed in place insulation or foam 142 which fills the voids or spaces 128 between the outwardly directed ribs or projections 78 and 98. The insulation or foam 142 may be one of numerous varieties of polyurethane, styrofoam or polyethylene and other single and dual component foams which may be readily injected into the interior void or spaces 128 to completely fill them. Relative to the first alternate embodiment bulkhead 70 and particularly to the preferred embodiment bulkhead 10, the second alternate embodiment bulkhead 140 exhibits significantly improved sound and thermal isolation between its faces. The insulation or foam 142 further improves the strength and rigidity of the bulkhead 140 as well.

While described above in conjunction with a cargo van 14, it should be appreciated that the bulkheads 10, 70 and 140 are equally suitable for installation and use in other types of motor vehicles such as minivans, sport utility vehicles (SUV's), station wagons, truck cabs, off road vehicles and other vehicles wherein the benefits and features of the bulkheads 10, 70 and 140 are desired.

The foregoing disclosure is the best mode devised by the inventors for practicing this invention. It is apparent, however, that apparatus incorporating modifications and variations will be obvious to one skilled in the art of vehicle fixtures. Inasmuch as the foregoing disclosure presents the best mode contemplated by the inventor for carrying out the invention and is intended to enable any person skilled in the pertinent art to practice this invention, it should not be construed to be limited thereby but should be construed to include such aforementioned obvious variations and be limited only by the spirit and scope of the following claims.

We claim:

1. A bulkhead adapted for disposition in a motor vehicle comprising, in combination,
    a first panel having a peripheral flange extending from at least a portion of said panel,
    said peripheral flange and said panel merging at a curved intermediate region,
    a plurality of alternating, projecting and recessed bands extending across said first panel and into said peripheral flange, and
    said peripheral flange defining a plurality of openings adapted to receive fasteners.

2. The bulkhead of claim 1 wherein said alternating, projecting and recessed bands are horizontal.

3. The bulkhead of claim 1 wherein said first panel defines an opening and including a window disposed in said opening.

4. The bulkhead of claim 1 wherein said peripheral flange includes cutout portions adapted to receive vehicle components.

5. The bulkhead of claim 1 wherein said peripheral flange is sized to be received within an interior of a motor vehicle.

6. The bulkhead of claim 1 wherein said peripheral flange includes side portions disposed generally parallel to said first panel.

7. The bulkhead of claim 1 further including a second panel having a plurality of alternating projecting and recessed bands and a peripheral flange, said first and said second panels secured together.

8. The bulkhead of claim 7 further including foam disposed between said first and said second panels.

9. A bulkhead adapted for disposition in a motor vehicle comprising, in combination,
    a panel having a flange extending from at least a portion of said panel,
    said flange and said panel merging at a curved intermediate region, and
    a plurality of alternating projecting and recessed regions extending across said panel and into said curved intermediate region.

10. The bulkhead of claim 9 wherein said flange extends in one direction from said panel.

11. The bulkhead of claim 9 wherein said alternating, projecting and recessed regions are horizontal.

12. The bulkhead of claim 9 wherein said panel defines an opening and further including a window disposed in said opening.

13. The bulkhead of claim 9 wherein said flange is sized to be received within an interior of a motor vehicle.

14. The bulkhead of claim 9 further including a second panel having a plurality of alternating projecting and recessed bands and a peripheral flange, said first and said second panels secured together.

15. The bulkhead of claim 14 further including foam disposed between said panels.

16. A bulkhead for disposition in a van or similar motor vehicle comprising, in combination,
    a first panel having a region of convolutions extending across said first panel,
    a first peripheral flange extending from at least a portion of said first panel,
    said first peripheral flange and said first panel merging at a curved intermediate region,
    a second panel having a region of convolutions extending across said second panel,
    a second peripheral flange extending from at least a portion of said second panel,
    said second peripheral flange and said second panel merging at a curved intermediate region.

17. The bulkhead of claim 16 wherein said peripheral flanges extending in one direction from said panels.

18. The bulkhead of claim 16 wherein said peripheral flanges include cutout portions adapted to receive vehicle components.

19. The bulkhead of claim 16 wherein said peripheral flanges are sized to be received within an interior of a van.

20. The bulkhead of claim 16 wherein said peripheral flanges include side portions disposed generally parallel to said panels.

21. The bulkhead of claim 16 wherein said panels define an opening and include a window assembly disposed in said opening.

22. A bulkhead adapted for disposition in a motor vehicle comprising, in combination,
    a panel defining an opening and having a flange extending from at least a portion of said panel,
    a window disposed in said opening,
    said flange and said panel merging at a curved intermediate region, and
    a plurality of alternating projecting and recessed regions extending across said panel and into said curved intermediate region.

* * * * *